United States Patent
Charette et al.

(10) Patent No.: US 10,839,230 B2
(45) Date of Patent: Nov. 17, 2020

(54) MULTI-TIER NETWORK FOR TASK-ORIENTED DEEP NEURAL NETWORK

(71) Applicant: Ford Global Technologies, LLC, Dearborn, MI (US)

(72) Inventors: Francois Charette, Tracy, CA (US); Jose Solomon, Belmont, CA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 82 days.

(21) Appl. No.: 16/123,905

(22) Filed: Sep. 6, 2018

(65) Prior Publication Data
US 2020/0082174 A1    Mar. 12, 2020

(51) Int. Cl.
*G06K 9/00* (2006.01)
*G06N 3/04* (2006.01)
*G06K 9/62* (2006.01)
*G05D 1/00* (2006.01)

(52) U.S. Cl.
CPC ....... *G06K 9/00791* (2013.01); *G05D 1/0088* (2013.01); *G06K 9/627* (2013.01); *G06K 9/628* (2013.01); *G06N 3/0454* (2013.01)

(58) Field of Classification Search
CPC .... G06K 9/00791; G06K 9/628; G06K 9/627; G06N 3/0454; G05D 1/0088
See application file for complete search history.

(56) References Cited

U.S. PATENT DOCUMENTS

| | | | |
|---|---|---|---|
| 9,412,361 B1 * | 8/2016 | Geramifard | G10L 25/51 |
| 9,946,260 B2 | 4/2018 | Shashua | |
| 9,977,430 B2 | 5/2018 | Shalev-Shwartz | |
| 9,989,964 B2 | 6/2018 | Berntorp | |
| 2010/0318240 A1 * | 12/2010 | Kindo | G08G 1/166 |
| | | | 701/1 |
| 2017/0329331 A1 * | 11/2017 | Gao | B60W 50/0098 |
| 2018/0089563 A1 * | 3/2018 | Redding | G06F 16/9027 |
| 2018/0157972 A1 * | 6/2018 | Hu | G06N 3/08 |
| 2019/0164051 A1 * | 5/2019 | Saleem | G06N 3/08 |
| 2019/0236379 A1 * | 8/2019 | Golov | G05D 1/0088 |
| 2019/0286153 A1 * | 9/2019 | Rankawat | G05D 1/0246 |
| 2019/0311494 A1 * | 10/2019 | Ramalingam | G06K 9/6262 |
| 2019/0317507 A1 * | 10/2019 | Zhang | G05D 1/0238 |
| 2019/0384304 A1 * | 12/2019 | Towal | G06N 3/04 |

FOREIGN PATENT DOCUMENTS

| | | | | |
|---|---|---|---|---|
| CN | 107226087 A | 10/2017 | | |
| EP | 3219564 B1 * | 12/2018 | | B60W 40/06 |
| JP | 07306717 A | 11/1995 | | |

OTHER PUBLICATIONS

End to End Learning for Self-Driving Cars (Year: 2016).*
End to End Learning for Self-Driving Cars.

* cited by examiner

*Primary Examiner* — Nizar N Sivji
(74) *Attorney, Agent, or Firm* — David R. Stevens; Stevens Law Group

(57) ABSTRACT

A method for controlling an autonomous vehicle is disclosed. The method may include receiving image data. The image data may be logistically classified by a first neural network as pertaining to one situation of a plurality of situations. Based on this logistic classification, the image data may be assigned to a second neural network that is specifically trained to address the one situation. The second neural network may perform regression on the image data. Thereafter, the vehicle may be control with a command based on the regression.

16 Claims, 7 Drawing Sheets

MULTI-TIER NETWORK FOR TASK-ORIENTED DEEP NEURAL NETWORK

BACKGROUND

Field of the Invention

This invention relates to autonomous systems and more particularly to systems and methods for autonomous driving.

Background of the Invention

Current state-of-the art autonomous, vehicle-driving technologies are rule-based algorithms. They require that every new situation or condition be anticipated, "engineered" into the algorithm, and hard coded into the software. As a result, rule-based algorithms are difficult to scale. Additionally, the larger the rule-based algorithm becomes, the greater the risk of bugs and conflicting conditions that can lead to error states. Accordingly, what is needed are better systems and methods for autonomous driving.

BRIEF DESCRIPTION OF THE DRAWINGS

In order that the advantages of the invention will be readily understood, a more particular description of the invention will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Figure 1:
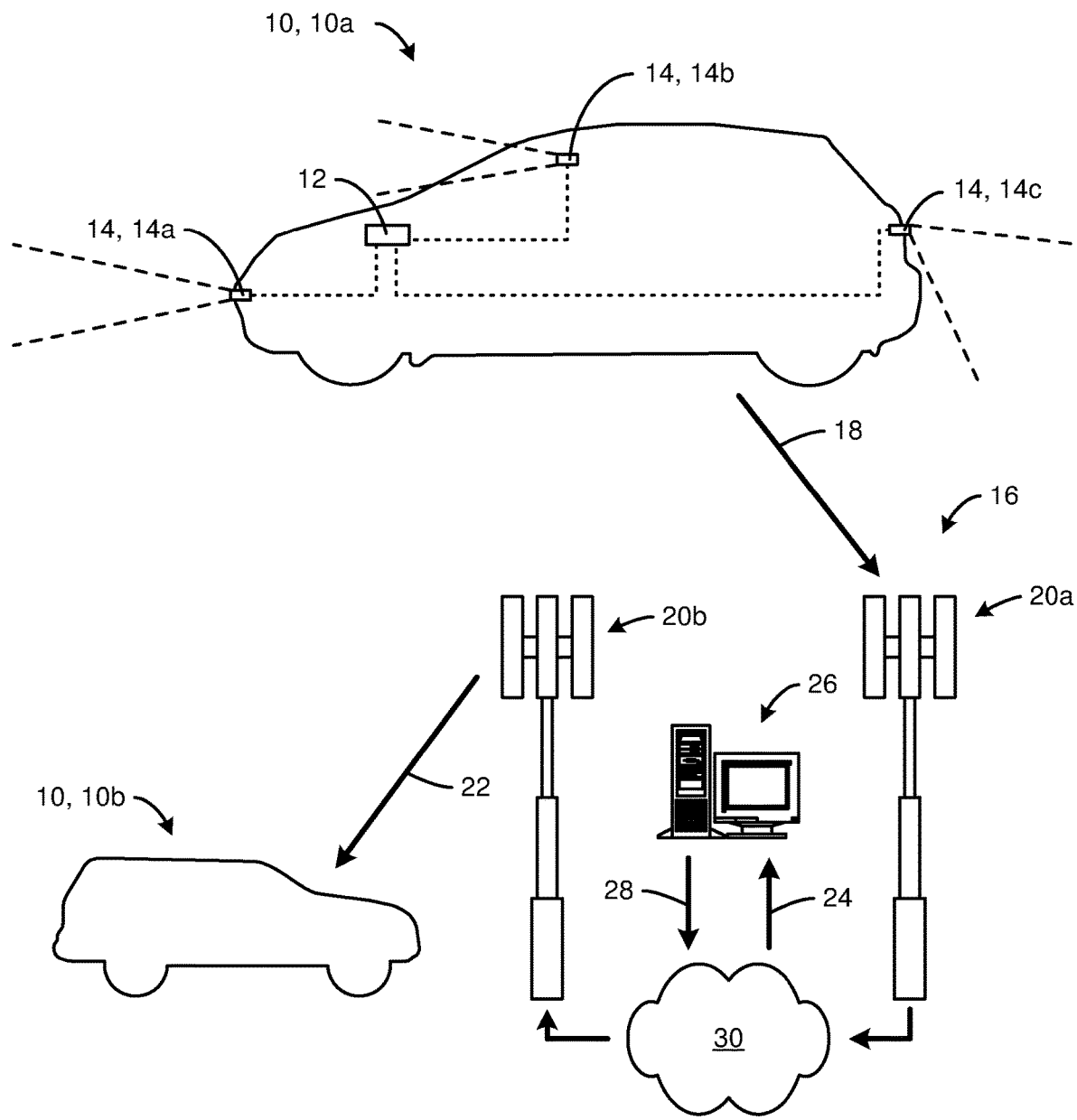
FIG. 1 is a schematic diagram illustrating one embodiment of the technological context within which a system and method for autonomous control in accordance with the present invention may operate.

Referring to FIG. 1, autonomous vehicles 10 in accordance with the present invention may provide "end-to-end" driving. Such vehicles 10 may use a deep neural network (DNN) that receives image data (e.g., stereo camera images) and outputs driving controls (i.e., steering and/or throttle commands). No other sensors may be required. Additional mixes or variants of algorithms may also not be required.

One challenge in using a DNN for controlling an autonomous vehicle 10 is that a huge amount of data may be required for training the DNN. One of the most important advantages of using a DNN is that once it is trained with enough data covering a significant range of situations or conditions, then the DNN may, when presented with a new condition that it has never seen, automatically interpolate and acceptably manage the new condition. Only if the new condition is outside the range of previous conditions that the DNN was trained on will there be the potential for failure.

Accordingly, a primary benefit of a DNN over a classic, rule-based algorithm is that to include a new condition, data recordings that represent this new condition simply need to be added to the training data and the DNN, once re-trained, will be able to appropriately handle the new condition. No change to the DNN architecture (i.e., algorithms) may be required, only simply to add data to the training set and re-train. This approach makes scalability much more feasible. Very little engineering labor may be required to maintain and scale an autonomous system 10 that uses a DNN. Furthermore, over time, the performance of a DNN may continuously improve requiring less and less adding of new data and re-training. After a certain amount of time, a DNN may become so robust that it requires very little to no engineering supervision.

In selected embodiments, an autonomous vehicle 10 in accordance with the present invention may comprise a computerized system 12 and a plurality of sensors 14. A system 12 may use the outputs of one or more such sensors 14 to determine how best to control various functions or operations of the corresponding autonomous vehicle 10. The sensors 14 included within an autonomous vehicle 10 may take any suitable form. For example, one or more sensors 14 may comprise cameras, lidar devices, radar devices, ultrasonic transducers, accelerometers, gyroscopes, speedometers, thermometers, drive train sensors (e.g., devices for sensing RPM of an engine, wheel slippage, or the like), global positioning system (GPS) devices, or the like, or a combination or sub-combination thereof.

In certain embodiments, a system 12 in accordance with the present invention may control one or more core functions of an autonomous vehicle 10 (i.e., functions that are fundamental to the driving of the autonomous vehicle 10). For example, a system 12 may autonomously control the steering and/or speed of a vehicle 10. Thus, a system 12 may control a collection of components, linkages, actuators, or the like that affect the course taken by the vehicle 10, a throttle setting on an engine, braking, or the like or a combination or sub-combination thereof.

In selected embodiments, one or more sensors 14 in accordance with the present invention may be forward-facing sensors 14a (e.g., cameras, cameras capturing stereo images, or the like directed to an area ahead of a vehicle 10), point-of-view sensors 14b (e.g., cameras, cameras capturing stereo images, or the like capturing an occupant's point of view through a windshield), rearward-facing sensors 14c (e.g., back-up cameras), or the like or a combination or sub-combination thereof.

In selected embodiments, information received, collected, or generated by a system 12 (or portions of a system 12) on-board an autonomous vehicle 10 may be communicated to some hardware located off-board the autonomous vehicle 10. That is, such information may be passed vehicle-to-infrastructure (V2I). For example, information received, collected, or generated by a system 12 corresponding to one autonomous vehicle 10a may be passed through a communication system 16 to one or more other autonomous vehicles 10b. Accordingly, information received, collected, or generated by a system 12 corresponding to one autonomous vehicle 10a may be used (e.g., wholly adopted or taken into consideration) by systems 12 corresponding to one or more other autonomous vehicles 10b.

In selected embodiments, selected information may be passed by a system 12 into a communication system 16 comprising stationary telecommunication infrastructure. For example, a system 12 may feed 18 selected information into a cellular telephone network by sending one or more signals to a nearby cellular tower 20a. In selected embodiments, information fed 18 in by a system 12 may be routed through a communication system 16 and delivered 22 to corresponding systems 12 of one or more other vehicles 10b. Alternatively, information fed 18 into a communication system 16 by a system 12 may be delivered 24 to a computer system 26, processed by the computer system 26, fed 28 by the computer system 26 back into the communications system 16, and delivered 22 to corresponding systems 12 of one or more other vehicles 10b.

For example, in selected embodiments, a communication system 16 may include a cellular telephone network comprising a first cellular tower 20a located near a first autonomous vehicle 10a, a second cellular tower 20b located near a second autonomous vehicle 10b, and a network 30 connecting the first cellular tower 20a to the second cellular tower 20b. A computer system 26 may also connect to the network 30. Accordingly, information fed 18 into the cellular telephone network by a system 12 corresponding to the first vehicle 10a may be received by the computer system 26 so that it can be recorded and/or processed and distributed to one or more other vehicles 10b, or the like or a combination or sub-combination thereof.

In certain embodiments, information may be passed from the top down, rather than from peer to peer. For example, information may be passed from a computer system 26 connected to a network 30 to one or more autonomous vehicles 10a, 10b. Information passed from the top down may include software updates, a re-trained DNN, or the like.

Figure 2:
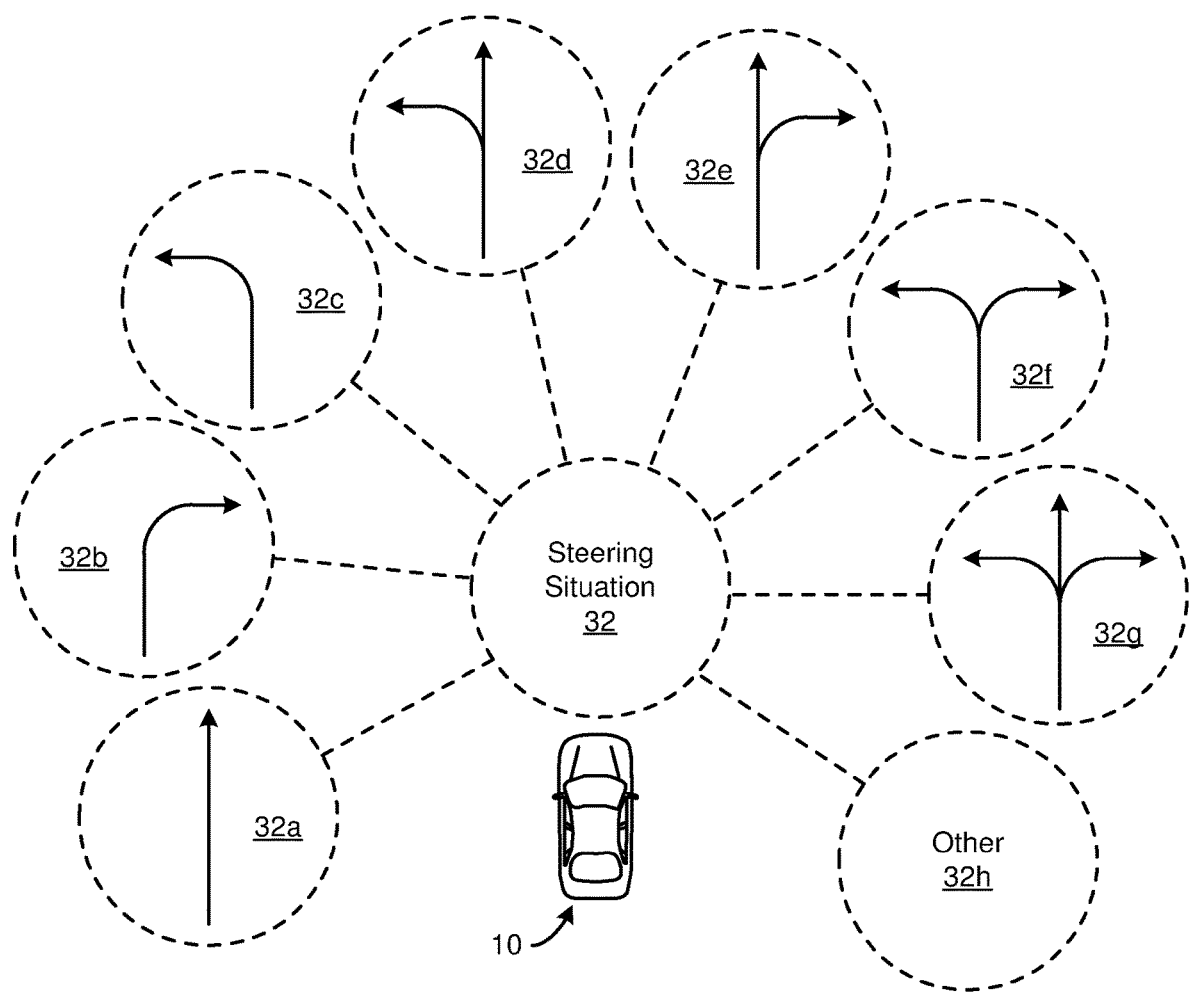
FIG. 2 is a schematic diagram illustrating multiple typical steering situations that may be encountered by an autonomous vehicle using systems and methods for autonomous control in accordance with the present invention.

Referring to FIG. 2, as an autonomous vehicle 10 in accordance with the present invention travels down a road, it may serially encounter a stream of different steering situations 32. Although the number of different steering situations 32 a vehicle 10 may encounter is substantially unlimited, they may be divided into a finite set of types. For example, in certain embodiments, a finite set of seven typical steering situations 32 may cover most is not all of the different steering situations 32 a vehicle 10 may encounter.

In certain embodiments, the seven typical steering situations 32 may include: (1) a first typical steering situation 32a where a road extends straight ahead with no other options (e.g., no turn off options); (2) a second typical steering situation 32b where a road turns right with no other options; (3) a third typical steering situation 32c where a road turns left with no other options; (4) a fourth typical steering situation 32d where a road extends straight ahead, but also includes one other option, namely, a left turn; (5) a fifth typical steering situation 32e where a road extends straight ahead, but also includes one other option, namely, a right turn; (6) a sixth typical steering situation 32f where a road presents only two options, namely, a left turn and a right turn; and (7) a seventh typical steering situation 32g where a road extends straight ahead, but also includes two other options, namely, a left turn and a right turn. In selected embodiments, one or more other typical steering situations 32h may be defined and added to these seven as desired or necessary.

Despite the number of different steering situations 32 an autonomous vehicle 10 may encounter, the steering commands output by a computer system 12 may correspond to one of three tasks, namely, turn left, go straight, and turn right. Accordingly, a computer system 12 may include a first DNN corresponding to the task of going straight, a second DNN corresponding to the task of turning right, and a third DNN corresponding to the task of turning left. Each such DNN may have its own architecture optimized based on the complexity of the corresponding task. Furthermore, each such DNN may be trained separately using a wide range of data specific to the corresponding task. This may make the overall training more manageable and precise. For example, when re-training is necessary, only the DNN that needs re-training may be affected. The other DNNs may be left untouched.

Accordingly, when an autonomous vehicle 10 encounters a situation 32 falling within the first typical steering situation 32a, the computer system 12 may assign the task of generating an appropriate steering command to the first DNN. When an autonomous vehicle 10 encounters a situation 32 falling within the second typical steering situation 32b, the computer system 12 may assign the task of generating an appropriate steering command to the second DNN. When an autonomous vehicle 10 encounters a situation 32 falling within the third typical steering situation 32c, the computer system 12 may assign the task of generating an appropriate steering command to the third DNN.

When an autonomous vehicle 10 encounters a situation 32 falling within one of the other typical steering situations 32d, 32e, 32f, 32g, the computer system 12 may need to determine which of the multiple available steering options to take. This determination may follow a default (e.g., a universal default, a situation-specific default dictated by a route-mapping software, or the like), a user preference or selection received from a "driver" or passenger of the vehicle 10, or the like. Once the particular steering option to be pursued is identified, a computer system 12 may then assign the task of generating an appropriate steering command to the first DNN, second DNN, or third DNN as appropriate.

Figure 3:
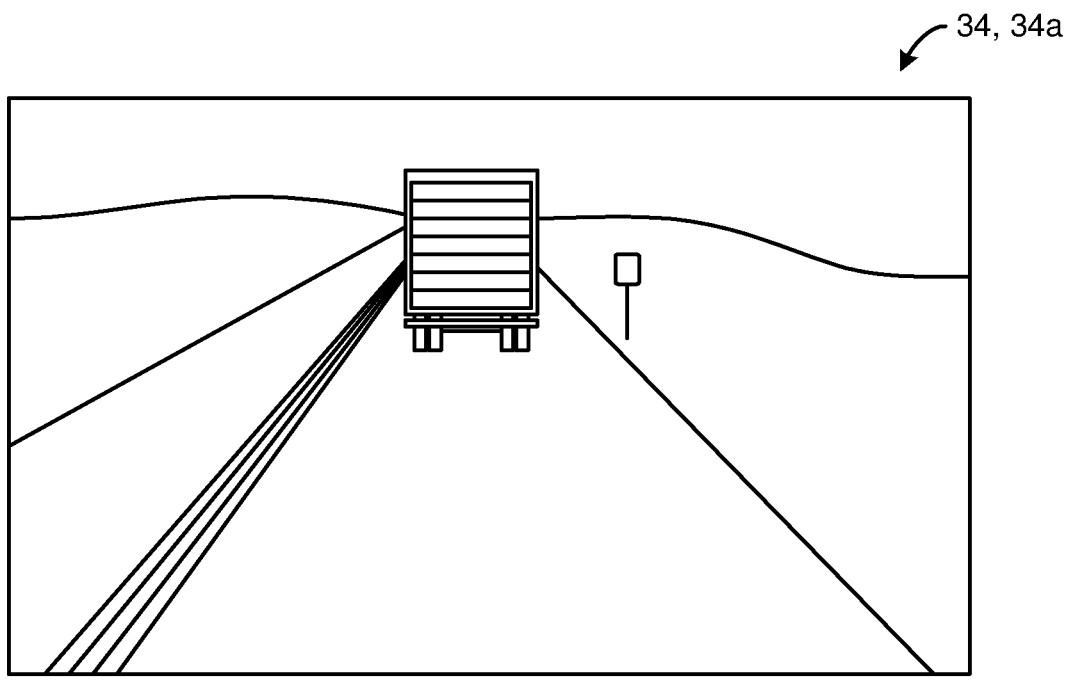
FIG. 3 is an image corresponding to one of the typical steering situations shown in FIG. 2.
Figure 4:
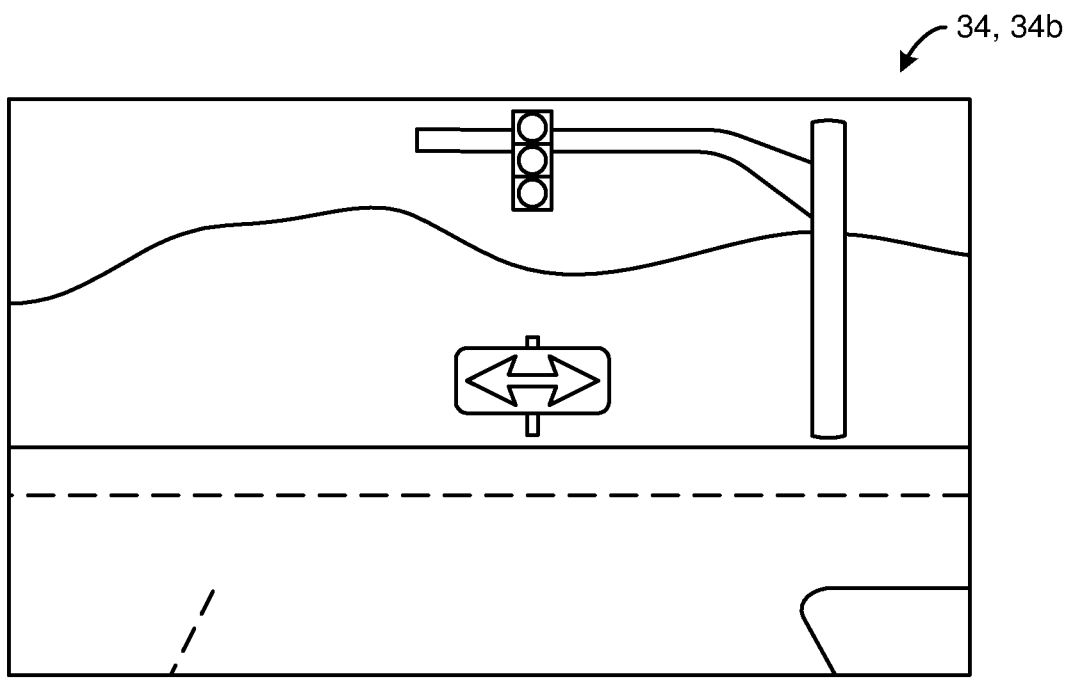
FIG. 4 is an image corresponding to a different situation of the typical steering situations shown in FIG. 2.

Referring to FIGS. 3 and 4, in selected embodiments, the task of determining which of the various typical steering situations 32a, 32b, 32c, 32d, 32e, 32f, 32g, 32h is being encountered may be assigned to a DNN. For example, in addition to a first, second, and third DNN, a computer system 12 may include a supervisory DNN. A supervisory DNN may be DNN-based classifier that is trained to identify the current task based on the road geometry. For example, a supervisory DNN may analyze incoming data 34 (e.g., stereo images 34 or frames 34 captured by two or more cameras 14) to determine which of the various typical steering situations 32a, 32b, 32c, 32d, 32e, 32f, 32g, 32h is being encountered.

If a supervisory DNN determines that the incoming data 34 corresponds to the first, second, or third typical steering situation 32a, 32b, 32c, a computer system 12 may respectively assign the task of generating an appropriate steering command to the first, second, or third DNN. For example, if particular incoming data 34a is an image of a road extending straight ahead with no turn off options, a supervisory DNN may identify the situation 32 as falling within the first typical steering situation 32a and the computer system 12 may assign the first DNN to generate an appropriate steering command. Conversely, if particular incoming data 34b is an image of a "T" intersection where a road presents only two options, namely, a left turn and a right turn, a supervisory DNN may identify the situation 32 as falling within the sixth typical steering situation 32f. Thereafter, the computer system 12 may determine whether to turn right or to turn left and respectively assign the second or third DNN to generate an appropriate steering command.

In selected embodiments, a network of supervisory, first, second, and third DNNs may be focused (e.g., focused exclusively) on generating steering commands. In such embodiments, throttle commands may be generated by one or more separate DNNs that may run in parallel with the DNNs dealing with steering commands. Alternatively, throttle commands may be generated by the first, second, and third DNNs. For example, a second DNN may output both a steering command and a throttle command appropriate for navigating a right turn depicted in the incoming data 34, which data 34 may include images of the road ahead, data characterizing the current speed of the vehicle 10, and any other data necessary to generate those commands. Accordingly, a computer system 12 may be an end-to-end system since it may use stereo images to directly output steering and/or throttle commands. It may be an end-to-end system that can also accommodate user inputs to allow path selection.

A computer system 12 with independently operating supervisory, first, second, and third DNNs may have the advantage of being very modular. However, it may be computationally intensive since convolution layers may be required in each task-specific DNN to process the incoming data 34. For example, in selected embodiments, at least two convolution operations may be required, one for the classifier (the supervisory DNN) and one for the task itself (the commend-generation task performed by the first, second, or third DNN). Depending on the size of the incoming data 34 (e.g., the size of the incoming images), the number of convolution layers, and other parameters (i.e., kernel size, stride, number of filters, etc.) certain computational delays may be encountered.

In selected embodiments, the architecture of a computer system 12 may be selected and/or designed to avoid or ameliorate any unacceptable computational delay for the particular application at hand. Alternatively, a computer system 12 may be arranged to reduce the number of convolution operations required.

For example, instead of passing the incoming data 34 (e.g., images) to each task module (e.g., the first, second, or third DNN) directly, the incoming data 34 may be processed using a convolution operation (one or more convolution layers) and then the output of that convolution operation may be passed to one of the various task modules. This may couple together all the modules (e.g., the supervisory, first, second, and third DNNs) within the network since they all share the same convolution operation in this architecture. The main advantage of this architecture is that only one convolution operation may be needed, which may improve inference speed. However, all the modules may be coupled, so all modules may need to be trained simultaneously.

Figure 5:
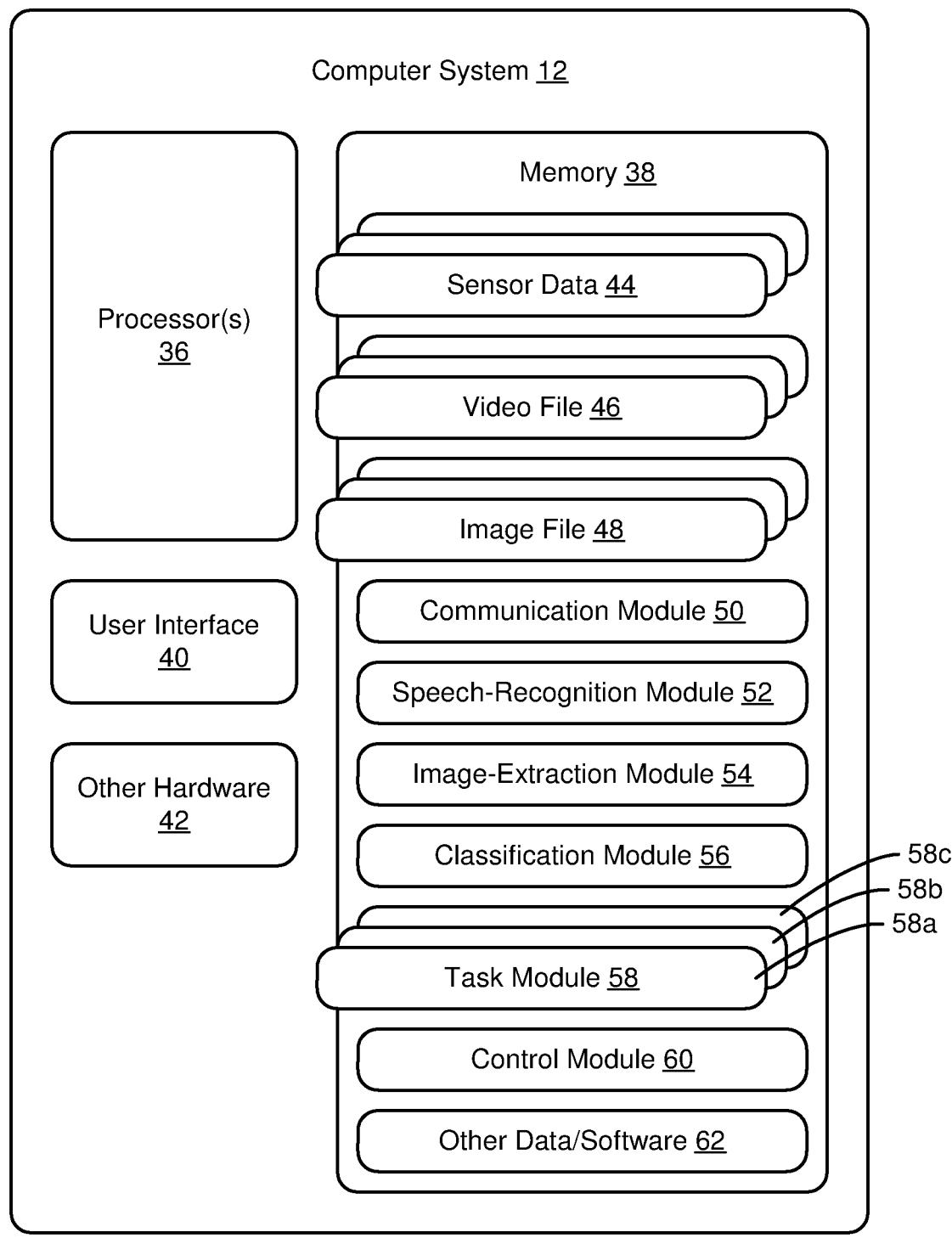
FIG. 5 is a schematic block diagram illustrating one embodiment of a system for autonomous control in accordance with the present invention.

Referring to FIG. 5, a system 12 in accordance with the present invention may operate in any suitable manner to support an end-end driving experience in accordance with the present invention. For example, a system 12 may be embodied as hardware, software, or some combination thereof.

In selected embodiments, a system 12 may include computer hardware and computer software. The computer hardware of a system 12 may include one or more processors 36, memory 38, one or more user interfaces 40, other hardware 42, or the like or a combination or sub-combination thereof. In certain embodiments, all or some subset of this computer hardware may be hardware already included as part of a vehicle 10. That is, all or some portion of the computer hardware may be multipurpose and perform tasks that are already associated with the operation of the vehicle 10. Alternatively, a system 12 in accordance with the present invention may be dedicated exclusively to enabling, supporting, and/or providing autonomous driving.

The memory 38 of a system 12 in accordance with the present invention may be operably connected to the one or more processors 36 and store the computer software. This may enable the one or more processors 36 to execute the computer software. Thus, a system 12 may augment the functionality or features of a vehicle 10 by adding and/or modifying software, adding additional hardware to the vehicle 10, or a combination thereof.

A user interface 40 of a system 12 may enable an engineer, technician, occupant (e.g., passenger), or the like to interact with, run, customize, or control various aspects of a system 12. A user interface 40 may enable a user to manually control (e.g., select, type in, incrementally increase or decrease at the touch of a button or twist of a knob) and/or orally control (e.g., issue one or more commands or requests using his or her voice) one or more operations of a vehicle 10 or to customize an autonomous driving experience to his or her liking. In selected embodiments, a user interface 40 of a system 12 may include one or more buttons, switches, knobs, keypads, keyboards, touch screens, pointing devices, microphones, speakers, or the like or a combination or sub-combination thereof. Alternatively, or in addition thereto, a user interface 40 may comprise one or more communication ports (e.g., plug in ports, wireless communication ports, etc.) through which one or more external computers or devices may communicate with a system 12 or one or more components thereof.

In selected embodiments, the memory 38 of a system 12 may store (at least temporarily) sensor data 44 (e.g., one or more segments of signal output by one or more sensors 14 carried on-board a vehicle 12), video 46 (e.g., one or more video files 46) collected or captured by one or more cameras 14 carried on-board a vehicle 12, one or more image files 48 containing, defining, or corresponding to one or more images captured by one or more cameras 14 or extracted from video collected or captured by one or more cameras 14, or the like or a combination or sub-combination thereof.

Additionally, the memory 38 may store one or more software modules. For example, the memory 38 may store a communication module 50, a speech-recognition module 52, an image-extraction module 54, a classification module 56, multiple task modules 58, a control module 60, other data or software 62, or the like or a combination or sub-combination thereof. Alternatively, one or more of the communication module 50, speech-recognition module 52, image-extraction module 54, classification module 56, multiple task modules 58, and control module 60 may be embodied as hardware or comprise hardware components. Thus, while FIG. 5 shows the communication module 50, speech-recognition module 52, image-extraction module 54, classification module 56, multiple task modules 58, and control module 60 as being software-only modules that are stored in memory 38, in actuality, one or more of these modules 50, 52, 54, 56, 58, 60 may comprise hardware, software, or a combination thereof.

A communication module 50 may enable data such as one or more segments of sensor data 44, video files 46, image files 48, software components (e.g., one or more modules 50, 52, 54, 56, 58, 60 or updates thereto), or the like or combinations of sub-combinations thereof to be passed into or out of a system 12 in accordance with the present invention. For example, a communication module 50 forming part of a system 12 carried on-board a vehicle 10 may enable the system 12 to receive an update to its classification module 56, one of its task modules 58, or the like. Accordingly, improvements developed off-board a vehicle 10 may be brought on-board as desired or necessary.

A speech-recognition module 52 may enable a system 12 to recognize and understand information, commands, requests, or the like provided by an occupant using his or her voice. Accordingly, in selected embodiments, a speech-recognition module 52 may provide, enable, or support certain capabilities with respect to automatic speech recognition (ASR) and natural language understanding (NLU). Leveraging such technologies, a speech-recognition module 52 may enable one or more speech commands or requests (e.g., words or phrases spoken by one or more occupants of an autonomous vehicle 10 to the autonomous vehicle 10 or one or more systems 12 thereof) to be properly interpreted.

An image-extraction module 52 may extract one or more images 34 from video captured by one or more cameras 14. For example, an image-extraction module 52 may extract one or more images 34 from a video file 46 that is stored in memory 38, video that is being output by a camera 14, or the like. In selected embodiments, an image-extraction module 52 may store one or more images 34 that are extracted thereby as image files 48 in memory 38.

A classification module 56 may be or provide a supervisory DNN in accordance with the present invention. Accordingly, a classification module 56 may be, include, or support an artificial neural network programmed to perform or apply deep learning. In certain embodiments, in operation, a classification module 56 may analyze incoming data 34 (e.g., stereo images 34 or frames 34 captured by two or more cameras 14) to determine which of the various typical steering situations 32a, 32b, 32c, 32d, 32e, 32f, 32g, 32h is being encountered. Thus, a classification module 56 may be said to perform logistic classification.

The deep learning performed or applied by classification module 56 may use one or more algorithms to model high-level abstractions in data corresponding to one or more portions of one or more images 34 collected by the one or more cameras 14 connected to a system 12 in accordance with the present invention. In selected embodiments, this may be accomplished by using multiple processing layers comprising multiple non-linear transformations.

For example, a supervisory DNN corresponding to a classification module 56 may comprise feed-forward computational graphs with input nodes, hidden layers and output nodes. For classifications that involve images, pixel-values of an input image forming part of the classification may be assigned to input nodes, and then be fed through the network, passing a number of non-linear transformations. At the end of the computation, the output node may yield a value that corresponds to the class inferred by the supervisory DNN.

In order for a supervisory DNN corresponding to a classification module 56 to be able to distinguish between different classes, it needs to be trained based on examples. Accordingly, to create a supervisory DNN that is able to classify a plurality of different steering situations 32, a large collection of example images 34 (e.g., hundreds to thousands for each type) having known (e.g., labeled) characteristics must be used as training data. Thus, using back-propagation, a supervisory neural network may be trained.

A supervisory DNN corresponding to a classification module 56 may be trained while operating within or on the hardware a non-production system 12. For example, a supervisory DNN may be trained on an off-board system 12 in a computer laboratory, a non-production system 12 carried on-board a test vehicle 10 specifically for the purposes of training, or the like. Once trained, a supervisory DNN may be "cloned" or otherwise copied onto or imported within a production system 12 forming part of a production vehicle 10.

When trained, a supervisory DNN corresponding to a classification module 56 may receive one or more inputs (e.g., one or more images 34 captured by one or more cameras 14) and classify those inputs as having a particular numeric affinity (e.g., percentage "score") for each class for which the supervisory DNN was trained. Accordingly, if a supervisory DNN were trained on ten different classes, then for one or more inputs, the supervisory DNN may output ten numeric scores. Each such score may be indicative of the affinity of the one or more inputs (or of the physical reality reflected by the one or more inputs) to a different class.

In a decisive or clear classification, the one or more inputs may show a strong affinity to one class and weak affinity to all other classes. In an indecisive or unclear classification, the one or more inputs may show no preferential affinity to any particular class. For example, there may be a "top" score for a particular class, but that score may be close to other scores for other classes.

Accordingly, in selected embodiments, a classification module 56 may apply one or more threshold comparisons or tests to determine whether any particular classification is sufficiently decisive or clear so as to be acted or relied upon (e.g., whether the classification is sufficiently decisive or clear so as to merit some change to the functioning of a vehicle 10). For example, a classification module 40 may test a classification to see if the separation between a top score and all other scores meets or satisfies a certain separation threshold.

A supervisory DNN in accordance with the present invention may be trained to recognize (e.g., produce affinity scores for) a certain, predetermined set of classes. The number of classes within such a set may vary between embodiments. In certain embodiments, the number of classes may correspond to the number of typical steering situations 32 a corresponding vehicle 12 is lightly to encounter. For example, if a vehicle 12 were only likely to encounter seven typical steering situations 32a, 32b, 32c, 32d, 32e, 32f, 32g, the number of classes may be seven.

A task module 58 may be or provide a DNN corresponding to a particular task. Different task modules 58 may be or provide different DNNs that correspond to different tasks. Each task module 58 and corresponding DNN may have its own architecture optimized based on the complexity of the corresponding task. In selected embodiments, a first task module 58a may be or provide a first DNN corresponding to the task of going straight, a second task module 58*b* may be or provided a second DNN corresponding to the task of turning right, and a third task module 58*c* may be or provide a third DNN corresponding to the task of turning left.

Each task module 58 may be, include, or support an artificial neural network programmed to perform or apply deep learning. Accordingly, the DNNs corresponding to the various task modules 58 may be configured, built, cloned, etc. as described above in connection with the DNN corresponding to the classification module 56. The primary difference between the DNNs corresponding to the various task modules 58 and the DNN corresponding to the classification module 56 is that the DNNs corresponding to the various task modules 58 perform regression rather than logistic classification. Thus, in certain embodiments, each task module 58 may analyze incoming data 34 assigned thereto (e.g., stereo images 34 or frames 34 classified as pertaining to the particular task module 58) and generate a numeric vehicle-control command (e.g., a floating point number) that will appropriately deal with a situation 32 being encountered by the corresponding vehicle 10.

A control module 60 may be programmed to request, initiate, or implement one or more actions or functions based on selected sensor data 44, the classifications determined by a classification module 56, the numeric vehicle-control commands generated by one or more task modules 58, or the like or a combination thereof. For example, when a control module 60 determines from a classification module 56 that a vehicle 10 is approaching a "T" intersection and from a speech-recognition module 52 that an occupant of the vehicle has issued a valid command to turn right, the control module 60 may assign the task of generating an appropriate steering command to a second task module 58*b* and see that the steering command so generated is properly executed. In certain embodiments, a control module 60 may coordinate the execution of multiple numeric vehicle-control commands generated by multiple task modules 58. For example, a control module 60 may coordinate the execution (e.g., simultaneous execution) of a numeric steering command, a numeric throttle command, and a numeric braking command generated by three different task modules 58.

Figure 6:
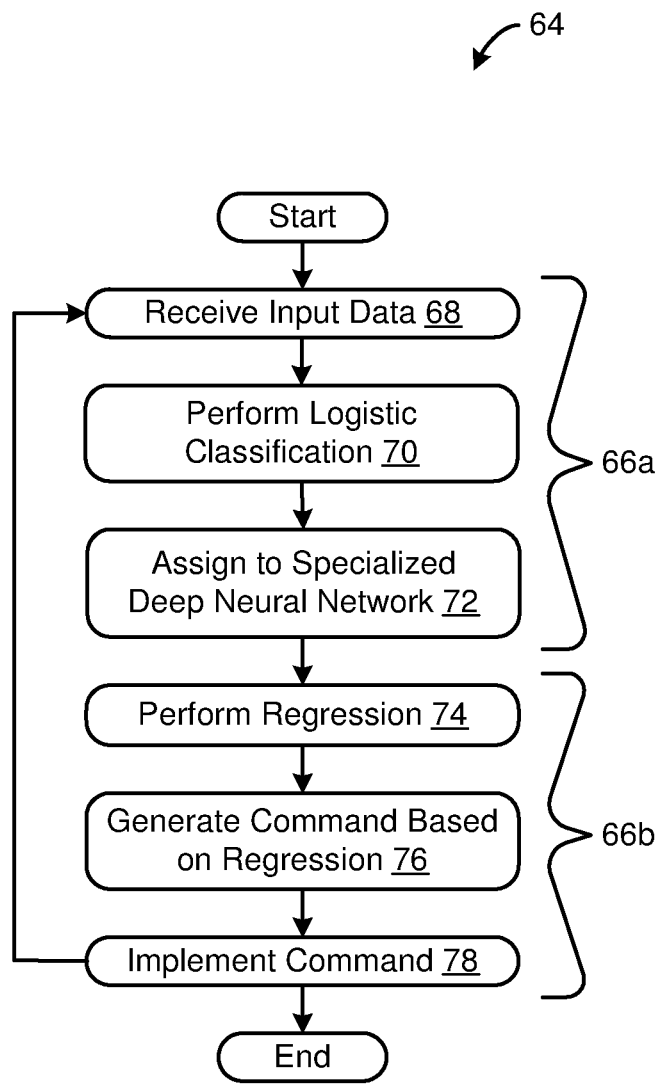
FIG. 6 is a schematic block diagram of one embodiment of a two-tiered method for autonomous control in accordance with the present invention.

Referring to FIG. 6, in selected embodiments, a system 12 in accordance with the present invention may perform a two-tiered command-generation method 64. In this method 64, various steps corresponding to a first, generalized classification (e.g., the work performed by a classification module 56) are performed in a first tier 66*a*, while various steps corresponding to a second, specialized classification (e.g., the work performed by one or more task modules 58) are performed in a second tier 66*b*.

For example, in a first tier 66*a*, a system 12 may receive 68 input data (e.g., sensor data 44, image data 34 in the form of one or more video or image files 46, 48, or the like or a combination or sub-combination thereof), perform 70 logistic classification to determine which type of situation 32 is being encountered, and then assign 72 the task of generating a control command to a specialized deep neural network that is specifically trained to address that type of situation 32. Thereafter, in a second tier 66*a*, the system 12 may use the specialized deep neural network to perform 74 regression, generate 76 a control command based on the regression, and then implement 78 the control command to appropriately address the specific details of the situation 32 being encountered.

A two-tiered command-generation method 64 in accordance with the present invention may be repeated (e.g., repeated multiple times per second) in order to generate a steady stream of control commands. This may keep a vehicle 10 abreast of the most appropriate approach for addressing a current situation 32 being encountered, which situation 32 may constantly be changing.

Figure 7:
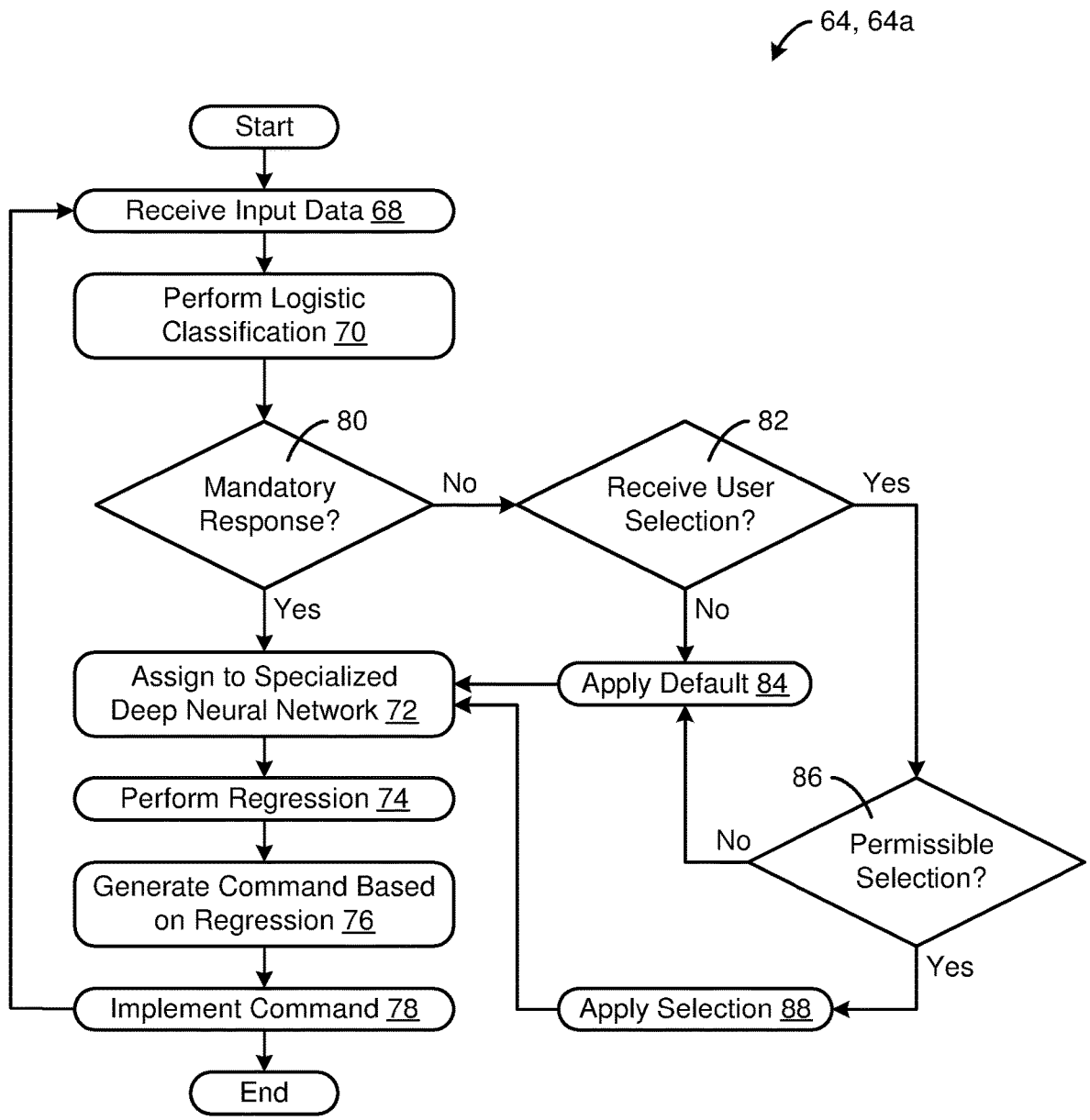
FIG. 7 is a schematic block diagram of an alternative embodiment of a two-tiered method for autonomous control in accordance with the present invention.

Referring to FIG. 7, in selected embodiments, a system 12 in accordance with the present invention may perform a two-tiered command-generation method 64*a* that is adapted to incorporate or respect user preferences or selections. In this method 64*a*, after a logistic classification is performed 70, a first determination 80 may be made as to whether there is a mandatory response to the type of situation 32 identified in the logistic classification. When there is a mandatory response, there is no need to incorporate or respect user preferences or selections. Accordingly, if there is a mandatory response, a system 12 may assign 72 the task of generating a control command to a specialized deep neural network that is specifically trained to address that type of situation 32.

For example, if the logistic classification indicates that a situation 32 being encountered by a vehicle 10 is a first typical steering situation 32*a* where a road extends straight ahead with no other options (e.g., no turn off options), the only appropriate response would be to drive straight. Similarly, if the logistic classification indicates that a situation 32 being encountered by a vehicle 10 is a second typical steering situation 32*b* where a road turns right with no other options, the only appropriate response would be to turn right. Thus, in situations 32 where there is a mandatory response, user preferences or selections need not be taken into account.

However, if there is no mandatory response, user preferences or selections may be taken into account. For example, if the logistic classification indicates that a situation 32 being encountered by a vehicle 10 is a fourth typical steering situation 32*d* where a road extends straight ahead, but also includes one other option, namely, a left turn, user preferences or selections may be taken into account in determining whether to go straight or turn left.

Accordingly, if there is no mandatory response, a second determination 82 may be made as to whether a user selection has been received. If no user selection has been received, a system 12 may apply 84 some default and assign 72 an appropriate specialized deep neural network in accordance with that default. In certain situations 32 or embodiments, a default may be to follow a path dictated by a route-mapping software, or the like. For example, if the current situation 32 is a fourth typical steering situation 32*d* where a road extends straight ahead, but also includes one other option, namely, a left turn and a route mapping software indicates that going straight is the best option, the system 12 may use going straight as a situation-specific default and assign 72 the task of generating a steering command to a first task module 58*a*.

Alternatively, or in different situations 32, a system 12 may use a more universal default. For example, a system 12 may be programmed such that if no user selection has been received and going straight is an option, the system 12 may use going straight as a universal default and assign 72 the task of generating a steering command to a first task module 58*a*.

When a user selection has been received, a third determination 86 may be made as to whether the user selection is permissible. If the user selection is not permissible, a system 12 may apply 84 a default as explained above. Alternatively, if the user selection is permissible, a system 12 may apply 88 the user selection and assign 72 an appropriate specialized deep neural network in accordance with that selection.

For example, if the current situation 32 is a sixth typical steering situation 32f where a road presents only two options, namely, a left turn and a right turn and a system 12 receives or has recently received a user selection to drive straight, the system 12 may determine 86 that the user selection is impermissible and apply 84 a default. Conversely, if a system 12 receives or has recently received a user selection to turn left, the system 12 may determine 86 that the user selection is permissible and assign 72 the task of generating a steering command to a third task module 58c.

In selected embodiments, second and third determinations 82, 86 in accordance with the present invention may involve a temporal component. This may enable a system 12 to accommodate typical human behavior. For example, if a vehicle 10 is driving down a road and a system 10 thereof receives a user voice command to "turn left," the system 12 need not determine 86 the permissibility of that selection for a current situation 32, but may "keep it in mind" for some period of time. Accordingly, if within a certain period of time after receiving the voice command, the vehicle 10 encounters a situation 32 where a left turn would be appropriate, the system 10 may apply 88 that selection at that time.

The length of that period of time wherein a system 12 keeps a particular user selection in mind may vary in different embodiments and with different vehicles, speeds, user selections, or the like. For example, the length of time corresponding to a user selection of "turn left," may be shorter than the length of time corresponding to a user selection of "take the next left" or "take the left up ahead." However, in certain embodiments, the length of time may be anywhere from a second or two to about 30 seconds.

Figure 8:
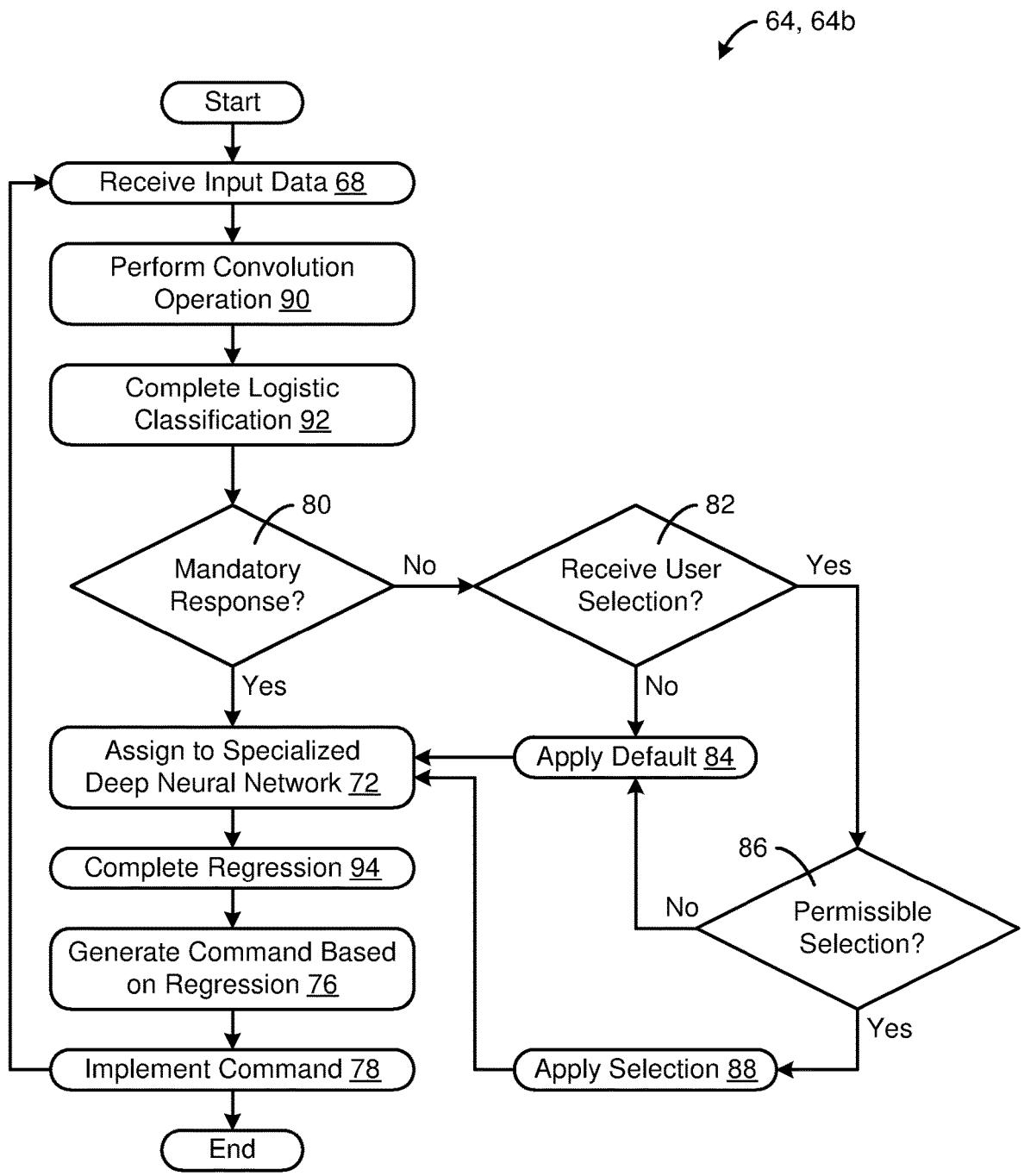
FIG. 8 is a schematic block diagram of another alternative embodiment of a two-tiered method for autonomous control in accordance with the present invention.

Referring to FIG. 8, in selected embodiments, a system 12 in accordance with the present invention may perform a two-tiered command-generation method 64b adapted to provide certain computational efficiencies. In this method 64b, rather than passing incoming data 34 to both the classification module 56 and the assigned task module 58 directly, the incoming data 34 may be first processed using a convolution operation (one or more convolution layers). That is, a convolution operation may be performed 90 on the incoming data. Thereafter, the classification module 56 and the assigned task module 58 need not repeat that convolution operation. Rather, they make take the processing from there and just complete 92, 94 the remaining work necessary to obtain or perform their respective logistic classification and regression.

Hereinabove, systems 12 and methods 64 have been applied primarily to the task of generating steering commands for autonomous vehicles 10. While, such systems 12 and methods 64 are well suited to that specific application, it should be understood that systems 12 and methods 64 in accordance with the present invention may be applied to any robotic situations wherein a two-tiered analysis (e.g., a first, generalized classification followed by a second, specialized classification) would be beneficial.

The flowcharts in FIGS. 6-8 illustrate the architecture, functionality, and operation of possible implementations of systems, methods, and computer-program products according to various embodiments in accordance with the present invention. In this regard, each block in the flowcharts may represent a module, segment, or portion of code, which comprises one or more executable instructions for implementing the specified logical function(s). It will also be noted that each block and/or combinations of blocks may be implemented by special purpose hardware-based systems that perform the specified functions or acts, or combinations of special purpose hardware and computer instructions.

It should also be noted that, in some alternative implementations, the functions noted in the blocks may occur out of the order noted in the Figures. In certain embodiments, two blocks shown in succession may, in fact, be executed substantially concurrently, or the blocks may sometimes be executed in the reverse order, depending upon the functionality involved. Alternatively or in addition thereto, certain steps or functions may be omitted if not needed.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," "selected embodiments," "certain embodiments," etc., indicate that the embodiment or embodiments described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein for purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The invention claimed is:

1. A method comprising:
running a computer system comprising (1) a supervisory neural network trained to perform classification with respect to a plurality of classes and (2) a plurality of specialized neural networks each trained to perform regression with respect to a different class of the plurality of classes;
receiving, by the computer system, image data;
classifying, by the supervisory neural network, the image data as pertaining to a first class of the plurality of classes;
assigning, by the computer system as a result of the classifying, the image data to a first specialized neural network of the plurality of specialized neural networks, wherein the first specialized neural network is specifically trained to perform regression with respect to the first class;
performing, by the first specialized neural network, regression on the image data; and
implementing, by the computer system, a command based on the regression.

2. The method of claim 1, wherein the computer system is carried onboard a vehicle.

3. The method of claim 2, wherein the command is a steering command for the vehicle.

4. The method of claim 3, wherein the plurality of classes comprises a drive straight class, a turn left class, and a turn right class.

5. The method of claim 4, wherein the first specialized neural network is trained to perform regression on images that have been classified as pertaining to the drive straight class and the plurality of specialized neural networks further comprises:
a second specialized neural network specifically trained to perform regression on images that have been classified as pertaining to the turn left class; and
a third specialized neural network specifically trained to perform regression on images that have been classified as pertaining to the turn right class.

6. The method of claim 4, wherein the first class is selected from the group consisting of the drive straight class, the turn left class, and the turn right class.

7. The method of claim 1, further comprising:
receiving, by the computer system, other image data;
classifying, by the supervisory neural network, the other image data as pertaining to a second class of the plurality of classes;
assigning, by the computer system as a result of the classifying of the other image data, the other image data to a second specialized neural network of the plurality of specialized neural networks, wherein the second specialized neural network is specifically trained to perform regression with respect to the second class;

performing, by the second specialized neural network, regression on the other image data; and implementing, by the computer system, a subsequent command based on the regression on the other image data.

8. A multi-tiered method of processing image data in order to perform autonomous driving of a vehicle, the method comprising:

running a computer system onboard a vehicle, the computer system comprising (1) a supervisory neural network trained to perform classification with respect to a plurality of classes and (2) a plurality of specialized neural networks each trained to perform regression with respect to a different class of the plurality of classes;

capturing, by a camera carried onboard the vehicle, at least one image of an area in front of the vehicle;

classifying, by the supervisory neural network, the at least one image as pertaining to a first class of the plurality of classes;

assigning, by the computer system as a result of the classifying, the at least one image to a first specialized neural network of the plurality of specialized neural networks, wherein the first specialized neural network is specifically trained to perform regression with respect to the first class;

performing, by the first specialized neural network, regression on the at least one image; and implementing, by the computer system, a command based on the regression, the command affecting the driving of the vehicle.

9. The method of claim 8, wherein the command is a steering command for the vehicle.

10. The method of claim 9, wherein the plurality of classes comprises a drive straight class, a turn left class, and a turn right class.

11. The method of claim 10, wherein the first specialized neural network is trained to perform regression on images that have been classified as pertaining to the drive straight class.

12. The method of claim 11, wherein the plurality of specialized neural networks further comprises:

a second specialized neural network specifically trained to perform regression on images that have been classified as pertaining to the turn left class; and a third specialized neural network specifically trained to perform regression on images that have been classified as pertaining to the turn right class.

13. A system comprising:

at least one processor carried on-board an autonomous vehicle; and first memory operably connected to the at least one processor, the first memory storing software programmed to provide a supervisory neural network trained to classify images as pertaining to one class of a plurality of classes, provide a plurality of specialized neural networks, wherein each specialized neural network of the plurality of specialized neural networks is specifically trained to perform regression on images pertaining to a different class of the plurality of classes, receive image data, feed the image data to the supervisory neural network, feed the image data to a specific specialized neural network of the plurality of specialized neural networks based on the classification performed by the supervisory neural network on the image data, and control operation of the autonomous vehicle in accordance with the regression performed by the specific specialized neural network on the image data.

14. The system of claim 13, wherein the first memory stores software programmed to steer the autonomous vehicle in accordance with the regression performed by the specific specialized neural network on the image data.

15. The system of claim 14, wherein the plurality of classes comprises a drive straight class, a turn left class, and a turn right class.

16. The system of claim 15, wherein the plurality of specialized neural networks comprises:

a first specialized neural network specifically trained to perform regression on images that have been classified as pertaining to the drive straight class;

a second specialized neural network specifically trained to perform regression on images that have been classified as pertaining to the turn left class; and a third specialized neural network specifically trained to perform regression on images that have been classified as pertaining to the turn right class.

* * * * *